July 4, 1950 U. PIANTA 2,514,350
STRAIGHT-BAR KNITTING MACHINE
Filed April 17, 1947
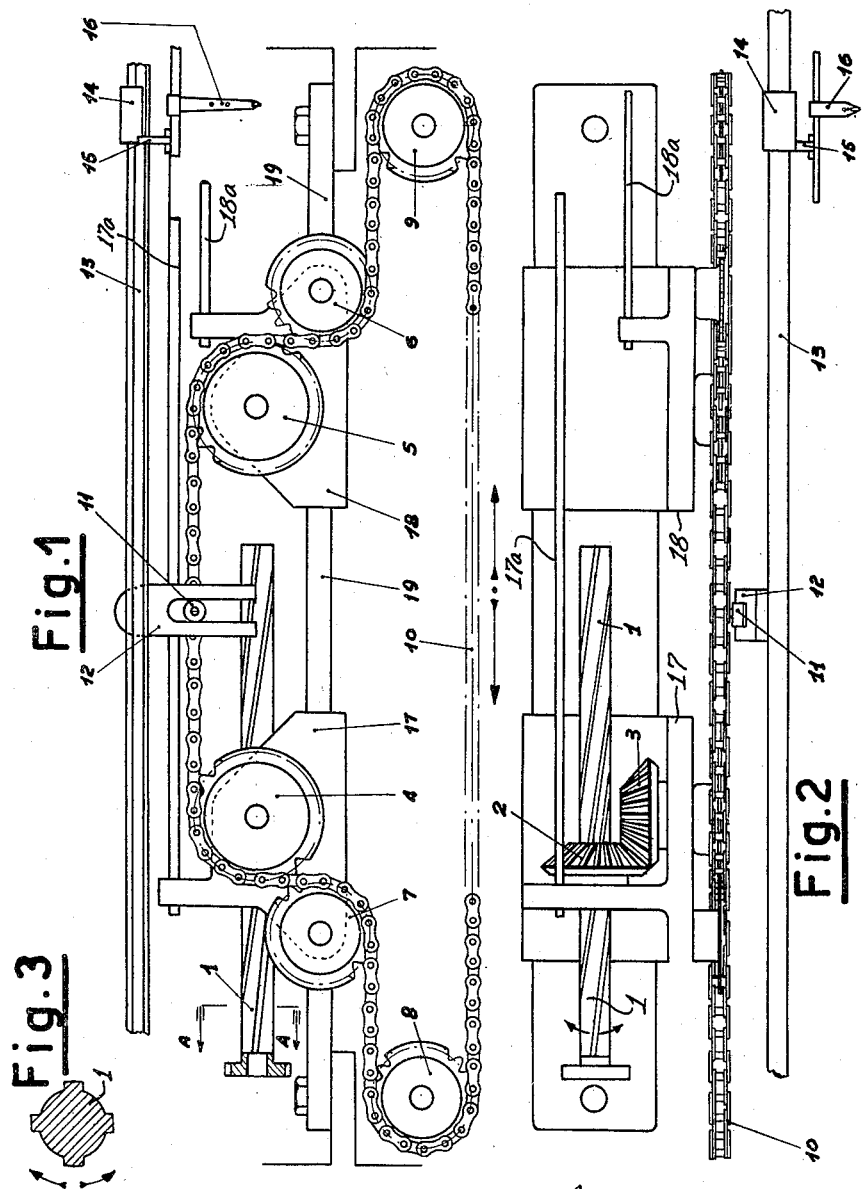

Patented July 4, 1950

2,514,350

UNITED STATES PATENT OFFICE 2,514,350

STRAIGHT-BAR KNITTING MACHINE

Ubaldo Pianta, Milan, Italy, assignor to Societa Italiana Ernesto Breda Per Costruzioni Meccaniche, Milan, Italy, a firm Application April 17, 1947, Serial No. 742,183
In Italy February 16, 1946

Section 1, Public Law 690, August 8, 1946
Patent expires February 16, 1966

4 Claims. (Cl. 66—126)

In the straight-bar knitting machines known up to now, particularly Cotton's machines for stockings, the velocity of the carrier rod at the end of each stroke is slowed by means of devices comprising an open chain driven at its ends by a reciprocating driving bar.

The object of the present invention is to provide a driving mechanism for the above mentioned purpose, utilising one of the chain supports, the chain being endless and the reciprocating bar being eliminated.

In the aforementioned machines the chain supports are displaceable so as to obtain a variation of the fabric width (or of the stroke of the carrier-rod) that is of the number of meshes; therefore, should the chain be displaced by displacing one of its sprockets, the carrier-rod would be brought out of phase with respect to the sinkers.

In order to obviate this drawback which up to now involved the necessity of employing the reciprocating bar mechanism, the drive according to the present invention comprises a connection between the driving member and the driving sprocket mounted on one of the displaceable supports, such that when the support is moved the sprocket is caused to rotate by such an angle as to leave the chain stationary notwithstanding the displacement of the support bearing the driving sprocket.

In other words, the connection between the driving member and the driving sprocket is such as to allow the latter to move in a direction perpendicular to its axis, causing at the same time a rotation of said sprocket equal to its displacement divided by its radius; by this way the displacement of the sprocket involves no displacement of the chain, as the rotation (of course in the proper direction) exactly compensates the displacement, that is the sprocket in respect to the chain behaves as rolling on a stationary chain.

Such a connection may be realised in different manners; for example the sprocket might be axially integral with a spiral gear of same pitch diameter, driven by a worm of suitable length; obviously, by displacing the sprocket-gear unit parallel to the axis of the worm, the above mentioned rolling motion would take place.

A better and more accurate solution, however, can be obtained by actuating the driving sprocket by a bevel gearing in which the driving gear is axially slidable on a driving shaft and angularly fastened thereto through helicoidal engaging ribs or grooves having such an inclination that, by displacing the movable support relatively to the driving shaft, the consequent angle of rotation of the driving wheel be exactly as hereinbefore specified.

An embodiment of this solution is represented by way of an example in the attached drawing, wherein:

Fig. 1 is an elevation of the device;
Fig. 2 is a plan view of the same;
Fig. 3 is a cross section of the driving shaft on the line A—A of Fig. 1.

The ribbed driving shaft 1, having an alternating rotary motion communicated thereto by any suitable means (not shown), drives accordingly the endless chain 10 through pinions 2—3 and sprocket 4.

The chain, provided with the roller 11, drags the bar 13 which by means of the friction slipper 14 and the nose 15 drags in turn the carrier or carriers 16.

The sprockets 5—6—7—8—9 are loose, that is they rotate free on their journals whereas the driving sprocket 4 is fast with the pinion 3. The journals of the sprockets 4—7 and 5—6 are respectively integral with slides 17 and 18, which are slidable on the bar 19.

The chain 10 driven by the sprocket 4 reciprocates the bar 13 through the roller 11 and fork 12.

The aim of such known chain devices is to slow the ends of each stroke of the carriers due to the chain passing around the sprockets 4—5 independently from the amplitude of the stroke as obtained by increasing or diminishing correspondingly the spacing of the slide 17 with respect to the slide 18, the positions of both slides being controlled by the rods 17a and 18a as shown in the drawings.

It is established that the displacement of said slides is always symmetric in opposite directions.

It is to be observed that the yoke 12 is open at the bottom and straddles the rotary pin 11. Let it be supposed that the parts of the device are in the position shown as Figure 1. It is to be understood that the shaft 1 revolves a number of times in one direction by means of apparatus not here shown and then revolves in the opposite direction for the same number of times. This means that through the gear train 8, 7 and 4, the chain 10 is reciprocated in one direction or the other. Let us suppose that the gear chain is moved toward the left from the position in Figure 1. Then, when the yoke 12 rides over the sprocket 4, this yoke proceeds in a straight line but the rotary pin 11 moves downward from between the arms of the yoke. Thus, at this terminal of the movement the pin 11 is freed from the yoke and the operation of the reciprocating bar ceases. Then when the shaft 1 rotates in the opposite direction the rotary pin 11 comes up over the sprocket 4 and slips in between the arms of the yoke 12 and consequently causes that yoke and the chain connected thereto to move in the opposite direction. Obviously this effect will also take place upon the yoke of passing the sprocket 5. Consequently the space arranged between the sprockets 4 and 5 will regulate the length of the stroke of the bar 13. Now if the slides 17 and 18 are moved toward each other then the length of stroke of the reciprocating bar 13 is regulated. Furthermore, by the positioning of the slides 17 and 18 the positioning of the reciprocation of the bar 13 is established. Therefore the arrangement of this invention not only regulates the length of the reciprocating stroke of the bar 13 but also of its position.

In conventional devices, the chain (open chain) was dragged at its ends by a supplemental driving bar, as the roller 11 must maintain a perfectly symmetric position with respect to the motion, that is the to and fro strokes must be equal.

By the above described device, however, very simple means are employed to obtain the two aims required, that is:

(a) The support 17 bearing the driving sprocket 4 is rendered freely displaceable;

(b) The displacement of the slide rotates the pinion 2 and, consequently, pinion 3 and sprocket 4 with the required amplitude and direction.

Two variables can be used at will to attain said correct amplitude of rotation, that is the inclination of the ribs on the shaft 1 and the transmitting ratio of the gearing 2—3, the only limitation being that the inclination of the spiral ribs must be less than the friction angle between the materials forming the shaft 1 and the pinion 2.

Having now particularly described and ascertained the nature of my said invention and in what manner the same is to be performed, I declare that what I claim is:

1. In a straight-bar knitting machine, a fixed bar, a pair of slides mounted on said fixed bar for movement along the bar, a pair of freely revoluble sprockets mounted on said bar having fixed axial spacing, a pair of freely revoluble sprockets mounted on said slides, a second pair of sprockets mounted on said slides and having axial relation closer than the first pair of slide supported sprockets the axes of said second pair of sprockets lying in a plane higher than the axes of the first pair of slide mounted sprockets, one of said slides having a shaft journalled therein whereon a sprocket of the second slide supported pair is fixed, a chain extending between and around the first mentioned pair of sprockets to provide runs extending toward each other, said runs extending beneath and up around the first pair of slide supported sprockets and then up to and around the second pair of slide supported sprockets to provide an upper run of said chain extending between said second pair of slide supported sprockets, a reciprocable bar, means releasably connecting said reciprocable bar to a fixed part of the upper run of said chain, and means to effect oscillation of said shaft.

2. In a straight-bar knitting machine, a fixed bar, a pair of slides mounted on said fixed bar for movement along the bar, a pair of freely revoluble sprockets mounted on said bar having fixed axial spacing, a pair of freely revoluble sprockets mounted on said slides, a second pair of sprockets mounted on said slides and having axial relation closer than the first pair of slide supported sprockets the axes of said second pair of sprockets lying in a plane higher than the axes of the first pair of slide mounted sprockets, one of said slides having a shaft journalled therein whereon a sprocket of the second slide supported pair is fixed, a chain extending between and around the first mentioned pair of sprockets to provide runs extending toward each other, said runs extending beneath and up around the first pair of slide supported sprockets and then up to and around the second pair of slide supported sprockets to provide an upper run of said chain extending between said second pair of slide supported sprockets, a reciprocable bar, means releasably connecting said reciprocable bar to a fixed part of the upper run of said chain, a bevel gear fixed on said shaft, a second bevelled gear meshing with the first gear and provided with an axial opening, and an elongated oscillating shaft whereon said second gear is slidably mounted.

3. In a straight-bar knitting machine, a fixed bar, a pair of slides mounted on said fixed bar for movement along the bar, a pair of freely revoluble sprockets mounted on said bar having fixed axial spacing, a pair of freely revoluble sprockets mounted on said slides, a second pair of sprockets mounted on said slides and having axial relation closer than the first pair of slide supported sprockets the axes of said second pair of sprockets lying in a plane higher than the axes of the first pair of slide mounted sprockets, one of said slides having a shaft journalled therein whereon a sprocket of the second slide supported pair is fixed, a chain extending between and around the first mentioned pair of sprockets to provide runs extending toward each other, said runs extending beneath and up around the first pair of slide supported sprockets and then up to and around the second pair of slide supported sprockets to provide an upper run of said chain extending between said second pair of slide supported sprockets, a reciprocable bar, a downwardly opening yoke fixed to said reciprocable bar, a roller fixed on said chain to engage and disengage from said yoke upon the yoke passing around one of the second pair of slide supported sprockets, and means to effect oscillation of said shaft.

4. In a straight-bar knitting machine, a fixed bar, a pair of slides mounted on said fixed bar for movement along the bar, a pair of freely revoluble sprockets mounted on said bar having fixed axial spacing, a pair of freely revoluble sprockets mounted on said slides, a second pair of sprockets mounted on said slides and having axial relation closer than the first pair of slide supported sprockets the axes of said second pair of sprockets lying in a plane higher than the axes of the first pair of slide mounted sprockets, one of said slides having a shaft journalled therein whereon a sprocket of the second slide supported pair is fixed, a chain extending between and around the first mentioned pair of sprockets to provide runs extending toward each other, said runs extending beneath and up around the first pair of slide supported sprockets and then up to and around the second pair of slide supported sprockets to provide an upper run of said chain extending between said second pair of slide supported sprockets, a reciprocable bar, a downwardly opening yoke fixed to said reciprocable bar, a roller fixed on said chain to engage and disengage from said yoke upon the yoke passing around one of the second pair of slide supported sprockets, a bevel gear fixed on said shaft, a second bevelled gear meshing with the first gear and provided with an axial opening, and an elongated oscillating shaft whereon said second gear is slidably mounted.

UBALDO PIANTA.

No references cited.